United States Patent [19]

Moon

[11] Patent Number: 5,669,686
[45] Date of Patent: Sep. 23, 1997

[54] IMAGE PROJECTOR

[75] Inventor: Seong Hak Moon, Seoul, Rep. of Korea

[73] Assignee: LG Electronics Inc., Seoul, Rep. of Korea

[21] Appl. No.: 458,680

[22] Filed: Jun. 2, 1995

[30]     Foreign Application Priority Data

Jun. 10, 1994 [KR] Rep. of Korea ............... 13119/1994

[51] Int. Cl.⁶ .................................................. G03B 21/14
[52] U.S. Cl. .................................................. 353/98; 353/94
[58] Field of Search ............................ 353/122, 99, 98, 353/94, 30; 348/445, 458, 459, 750, 751

[56]             References Cited

U.S. PATENT DOCUMENTS 5,300,966  4/1994  Uehira et al. ........................ 353/37
5,386,252  1/1995  Oku ..................................... 348/746
5,521,658  5/1996  Donohoe ............................. 353/98

*Primary Examiner*—William Dowling
*Attorney, Agent, or Firm*—Fish & Richardson PC

[57]              ABSTRACT

An image projector having a compatibility so as to display an image having screen ratios of 4 to 3 and 16 to 9 includes a plurality of light sources for projecting light, a reflecting mirror portion for reflecting the light projected from the plurality of light sources onto a predetermined direction, a reflecting mirror controller for controlling the position of the reflecting mirror portion according to screen vertical-to-horizontal ratios, and a microcomputer for controlling the reflecting mirror portion and plurality of light sources according to screen vertical-to-horizontal ratios. The image projector can display compatibly an image having screen vertical-to-horizontal ratios of 16 to 9 and 4 to 3. Also, in the case of the screen vertical-to-horizontal ratios of 4 to 3, since two lamps are alternately used, the lamp life can be extended. The screen can be efficiently displayed according to screen vertical-to-horizontal ratios and a picture quality is improved by reducing the brightness difference of screens.

18 Claims, 5 Drawing Sheets screen first lamp  second lamp screen left  center  right brightness screen brightness

IMAGE PROJECTOR

BACKGROUND OF THE INVENTION

The present invention relates to an image projector, and more particularly, to an image projector having a compatibility so as to display an image having screen ratios of 4 to 3 and 16 to 9 (vertical magnitude to horizontal magnitude).

In the case of a conventional single panel image projector, as shown in FIG. 1, if the light is projected from a lamp 5 via a reflector, the light projected from a focusing lens 4 is focused to be transmitted to a projecting lens 1 via a liquid crystal panel 2 and a polarizing panel 3 positioned front and behind the liquid crystal panel 2. Then, an image is displayed on a screen through projecting lens 1.

Also, in the case of a conventional triple panel image projector, as shown in FIG. 2, the light projected from a lamp 16 is separated into red (R), green (G) and blue (B) light rays via a color separating mirror portion 15 and then the respective light rays are synthesized in a color synthesizing mirror portion 12 via liquid crystal panel 13 and focusing lens 14. Then, an image is displayed on a screen through a projecting lens 11.

However, according to the conventional image projector, if the image having a screen vertical-to-horizontal ratio of 4 to 3 is implemented as a ratio of 16 to 9, the type of the reflector should be changed or a lens size and lamp power should be changed. Also, the brightness is not uniform in the center and peripheral portion of the screen in the case of the image implemented as a screen ratio of 16 to 9, thereby lowering a picture quality.

SUMMARY OF THE INVENTION

To solve the above-described problems, it is an object of the present invention to provide an image projector which can display an image having screen ratios 4 to 3 and 16 to 9 compatibly by using two lamps and can extend a lamp life.

To accomplish the above object, the image projector according to the present invention comprises: a plurality of light sources for projecting light, a reflecting mirror portion for reflecting the light projected from the plurality of light sources onto a predetermined direction, a reflecting mirror controller for controlling the position of the reflecting mirror portion according to screen vertical-to-horizontal ratios, and a microcomputer for controlling the reflecting mirror portion and plurality of light sources according to screen vertical-to-horizontal ratios.

BRIEF DESCRIPTION OF THE DRAWINGS

The above objects and advantages of the present invention will become more apparent by describing in detail a preferred embodiment thereof with reference to the attached drawings in which:

FIGS. 7A to 7C show screen display states, in which FIG. 7A shows a simultaneous screen ratio display state of 4 to 3 and 16 to 9 in the prior art, FIG. 7B shows a screen ratio display state of 16 to 9 in the present invention, FIG. 7C shows a screen ratio display state of 4 to 3 in the present invention.

DETAILED DESCRIPTION OF THE INVENTION

Figure 1:
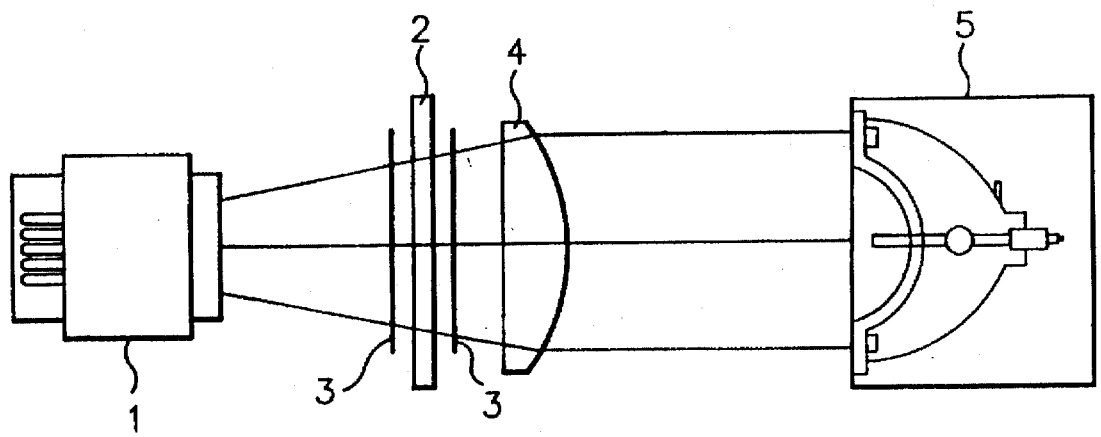
FIG. 1 is a schematic diagram of a conventional single panel image projector.
Figure 2:
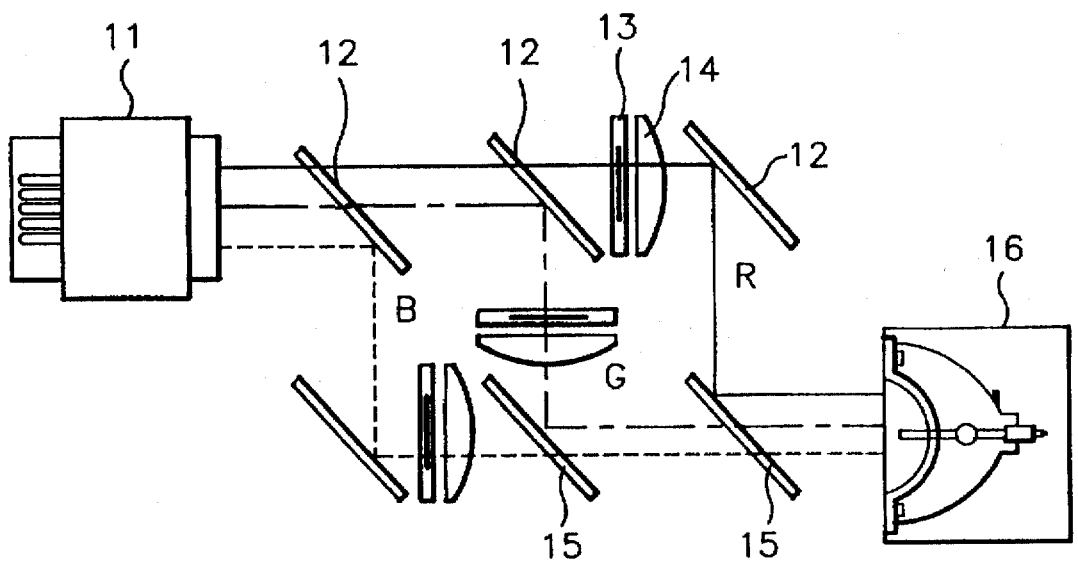
FIG. 2 is a schematic diagram of a conventional triple panel image projector.
Figure 3:
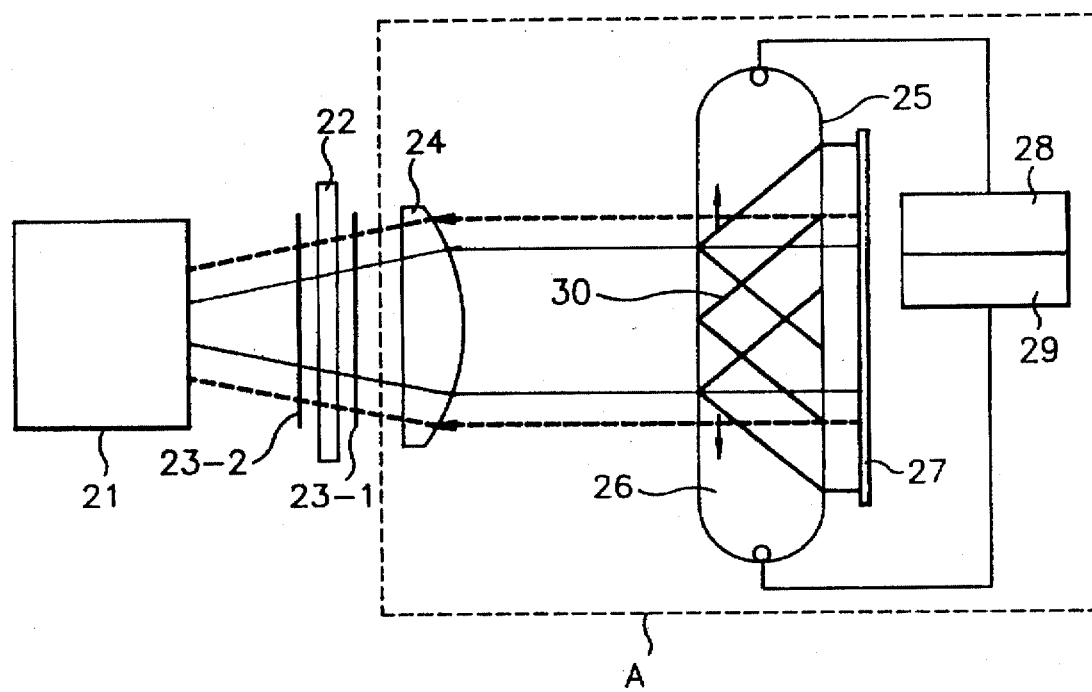
FIG. 3 is a schematic diagram of a single panel image projector according to an embodiment of the present invention.
Figure 4:
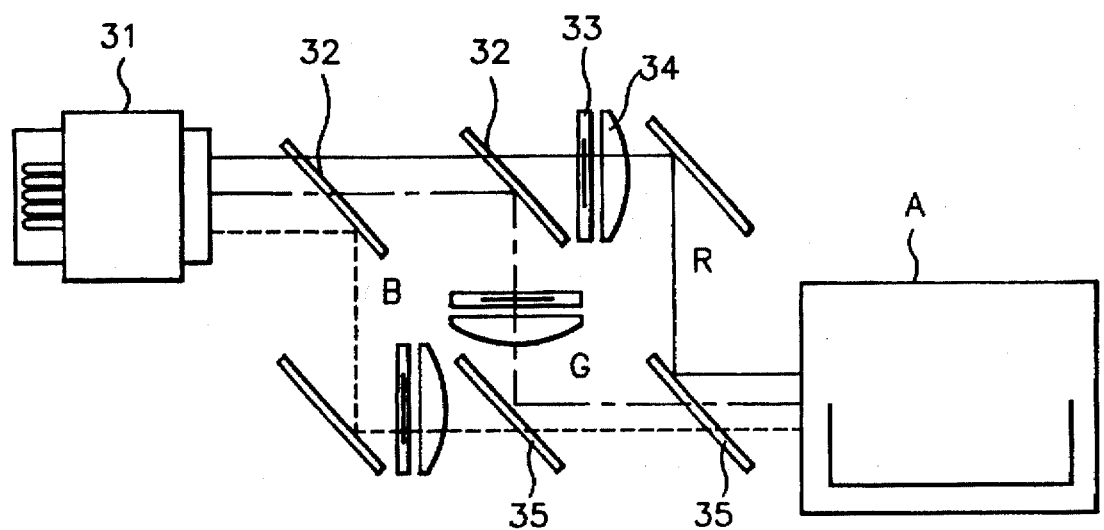
FIG. 4 is a schematic diagram of a triple panel image projector according to an embodiment of the present invention.

As shown in FIGS. 3 and 4, the image projector according to an embodiment of the present invention includes a plurality of light sources, a reflecting mirror portion 30, a reflecting mirror controller 27 and a microcomputer 29.

FIG. 3 is a schematic diagram of a single panel image projector and FIG. 4 is a schematic diagram of a triple panel image projector.

Plurality of light sources for projecting light are composed of two lamps 25 and 26 disposed up and down in view of reflecting mirror portion 30.

Reflecting mirror portion 30 for reflecting the light projected from two lamps 25 and 26 in a predetermined direction is vertically movable up and down so as to execute a reflection according to operation of two lamps 25 and 26. Also, as shown in FIGS. 5A and 5B, there may be provided with two reflecting mirrors having a predetermined angle. Otherwise, there may be provided with two reflecting mirrors being spaced apart and having a predetermined angle as shown in FIGS. 6A and 6B.

Figure 5C:
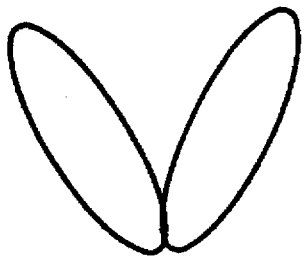
FIGS. 5A to 5C are schematic diagrams of a reflecting mirror portion shown in FIG. 3 according to an embodiment of the present invention.
Figure 6C:
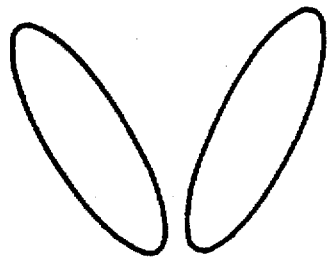
FIGS. 6A to 6C are schematic diagrams of a reflecting mirror portion shown in FIG. 3 according to another embodiment of the present invention.
Figure 5B:
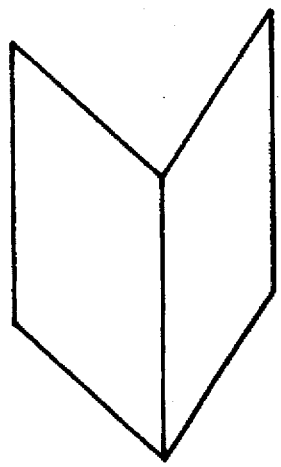
Figure 6B:
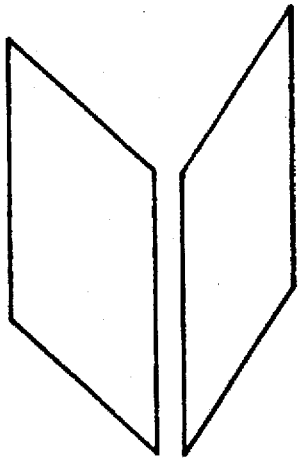
Figure 5A:
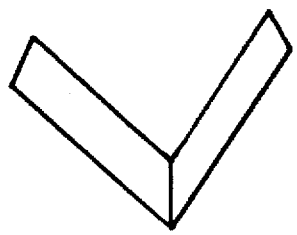
Figure 6A:
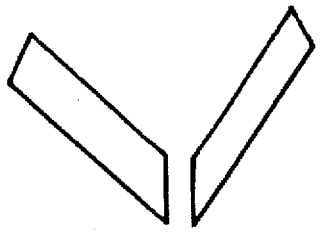

Here, two reflecting mirrors are rectangular shaped as shown in FIGS. 5B and 6B or circular or oblong shaped as shown in FIGS. 5C and 6C, respectively.

Reflecting mirror controller controls the position of reflecting mirror portion 30 according to screen vertical-to-horizontal ratios.

Microcomputer 29 controls the reflecting mirror portion 30 and plurality of light sources according to screen vertical-to-horizontal ratios.

That is to say, microcomputer 29 initiates the operation of a lamp in the case of the screen vertical-to-horizontal ratio being 4 to 3 and initiates the operation of two lamps in the case of the screen vertical-to-horizontal ratio being 16 to 9. Particularly, in the case of the screen vertical-to-horizontal ratio being 4 to 3, two lamps are alternately operated for a predetermined time.

The operation of the image projector according to an embodiment of the present invention having the aforementioned configuration will now be described.

First, the operation of the image projector adopting a single panel will be described according to the screen vertical-to-horizontal ratio of 16 to 9 with reference to FIG.3.

If an image is displayed on a screen in a ratio of 16 to 9, two lamps 25 and 26 operate simultaneously by the control of microcomputer 29 to then project the light toward a liquid crystal panel 22. The projected light is focused in a focusing lens 24, is projected via liquid crystal panel 22 and polarizing panels 23-1 and 23-2 positioned front and behind the liquid crystal panel 22, and is then projected onto a screen through a projecting lens 21.

Figure 7A:
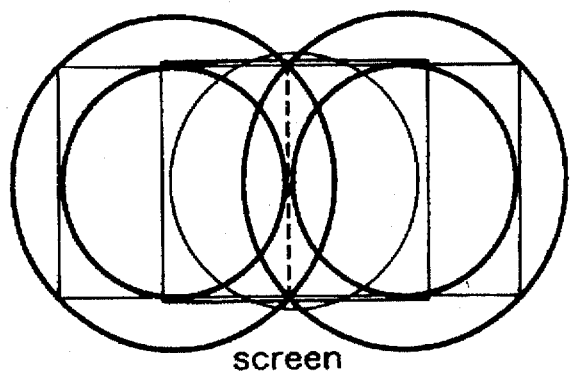
Figure 7B:
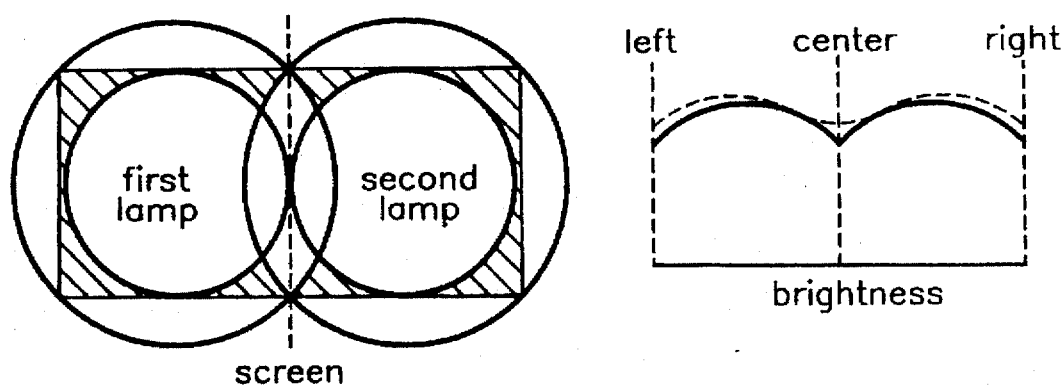
Figure 7C:
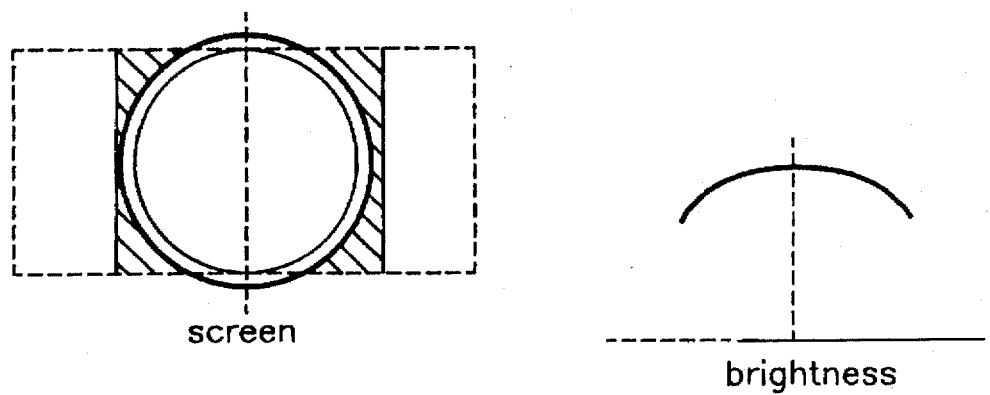

In such a manner, if the light is projected onto a screen, the image is displayed with a ratio of 16 to 9, as shown in FIG. 7B. At this time, compared to the conventional image projector as shown in FIG. 7A, the central portion of the image is wider and the peripheral portion becomes brighter.

Also, the operation of the image projector adopting a triple panel will be described according to the screen vertical-to-horizontal ratio of 4 to 3 with reference to FIG.3.

If an image is displayed on a screen in a ratio of 4 to 3, a ballast 28 and reflecting mirror controller 26 operate by the control of microcomputer 29 to adjust each lamp to be used for about two hours so that only a lamp of the two is used. Thus, as shown in FIG. 6A, the image is displayed on a screen so that the brightness is uniformly distributed, that is, there is no big difference in the brightness in the center and peripheral portion of the screen.

For example, if lamp 25 is used, lamp 26 is turned off by the control of microcomputer 29 to move reflecting mirror controller 27 downward (↓). Then, each rectangular or circular plane of two reflecting mirrors meets at the vicinity of liquid crystal panel 22. Otherwise, only one plane of each reflecting mirror disposed adjacently with each other is used to project light.

Next, the operation of the image projector adopting a triple panel will be described according to the screen vertical-to-horizontal ratio of 16 to 9 with reference to FIG. 4. As shown in FIG. 4, like the single panel image projector, the triple panel image projector includes two lamps, a reflecting mirror portion, a reflecting mirror controller, a ballast and a microcomputer. As conventionally, the light projected from two lamps is separated into red (R), green (G) and blue (B) light rays via a color separating mirror 35 and then the respective light rays are synthesized in a color synthesizing mirror 32 via liquid crystal panel 33 and focusing lens 34. Then, an image is displayed on a screen through a projecting lens 31.

Figure 8:
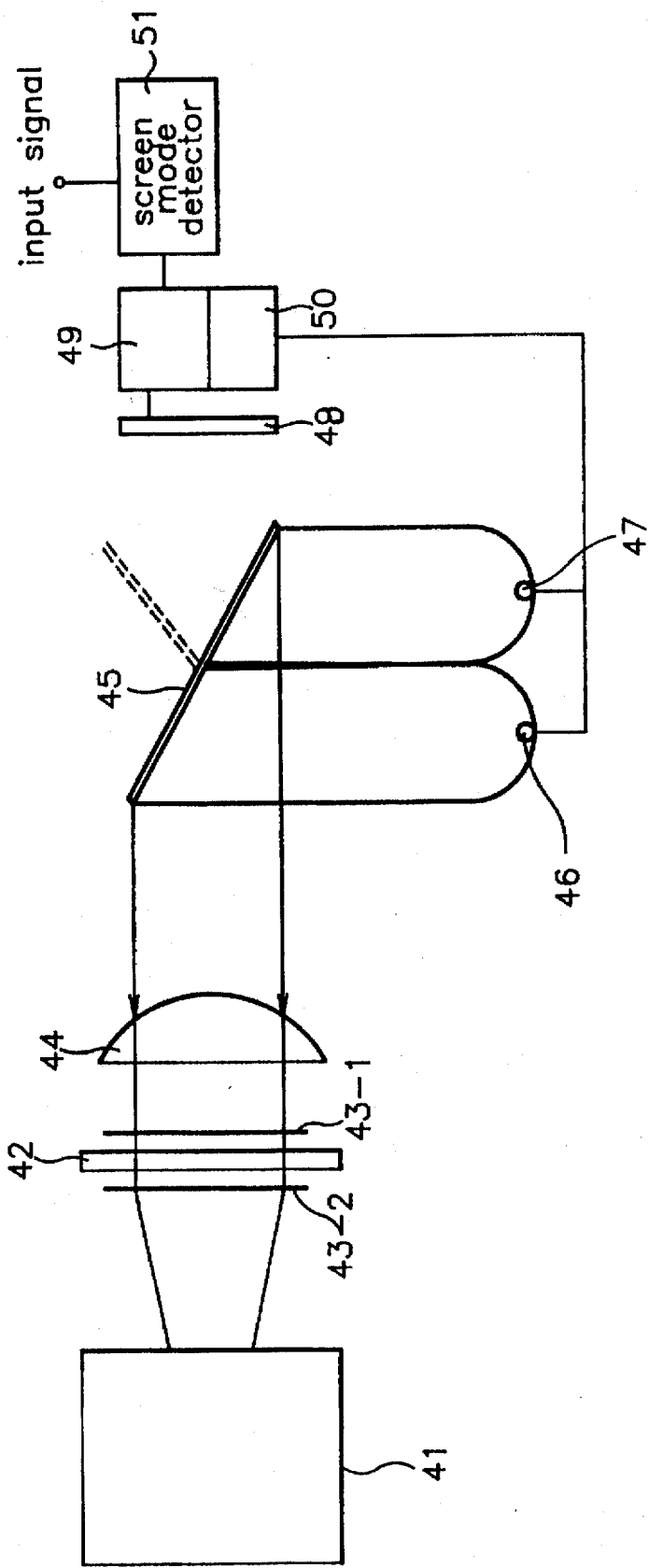
FIG. 8 is a schematic diagram of an image projector according to another embodiment of the present invention.

As shown in FIG. 8, the image projector according to another embodiment of the present invention includes a plurality of light sources, i.e., two lamps 46 and 47 are both disposed in one direction in view of a reflecting mirror portion. A part of a reflecting mirror 45 composing reflecting mirror portion is fixed and the other part thereof is folded or unfolded toward one plane according to the screen vertical-to-horizontal ratio.

Here, reflecting mirror portion is constituted so as to be obliquely movable up and down and reflecting mirror 45 composing reflecting mirror portion is rectangular, circular or oblong shaped.

Microcomputer 49 initiates the operation of a lamp in the case of the screen vertical-to-horizontal ratio being 4 to 3 and initiates the operation of two lamps in the case of the screen vertical-to-horizontal ratio being 16 to 9. Particularly, in the case of the screen vertical-to-horizontal ratio being 4 to 3, two lamps are alternately operated for a predetermined time.

The operation of the image projector according to another embodiment of the present invention having the aforementioned configuration will now be described.

If a control signal is output from a screen mode detector 51 to a microcomputer 49 according to screen vertical-to-horizontal ratios, microcomputer 49 applies a control signal to a reflecting mirror controller 48 to control reflecting mirror 45, or two lamps 46 and 47 are both disposed in one direction of reflecting mirror 45 and are let to be obliquely movable up and down (↖↘) along one plane of reflecting mirror 45 so as to execute a reflection depending on the operation of two lamps in the state where reflecting mirror 45 is folded in a predetermined angle according to screen vertical-to-horizontal ratios.

If two lamps 46 and 47 operate to project light toward liquid crystal panel 42, the projected light is focused in projecting lens 44, is projected via liquid crystal panel 42 and polarizing panels 43-1 and 43-2 positioned front and behind the liquid crystal panel 42, and is then projected onto a screen through a projecting lens 41.

As described above, the present invention has the following advantages.

Firstly, an image having screen vertical-to-horizontal ratios of 16 to 9 and 4 to 3 can be displayed compatibly.

Secondly, in the case of the screen vertical-to-horizontal ratios of 4 to 3, since two lamps are alternately used, the lamp life can be extended.

Thirdly, the screen can be efficiently displayed according to screen vertical-to-horizontal ratios.

Fourthly, a picture quality is improved by reducing the brightness difference of screens.

What is claimed is:

1. An image projector comprising:
   a plurality of light sources for projecting light;
   a reflecting mirror portion for reflecting the light projected from said plurality of light sources onto a predetermined direction;
   a reflecting mirror controller for controlling the position of said reflecting mirror portion according to screen vertical-to-horizontal ratios; and
   a microcomputer for controlling said reflecting mirror portion and plurality of light sources according to screen vertical-to-horizontal ratios.

2. An image projector as claimed in claim 1, wherein said plurality of light sources comprise lamps disposed above and below said reflecting mirror portion.

3. An image projector as claimed in claim 2, wherein said microcomputer initiates the operation of one of the lamps when the screen vertical-to-horizontal ratio is 4 to 3 and initiates the operation of the two lamps when the screen vertical-to-horizontal ratio is 16 to 9.

4. An image projector as claimed in claim 3, wherein said microcomputer initiates the operation of said two lamps alternately for a predetermined time when the screen vertical-to-horizontal ratio is 4 to 3.

5. An image projector as claimed in claim 2, wherein said reflecting mirror portion comprises two reflecting mirrors having a predetermined angle between the two reflecting mirrors.

6. An image projector as claimed in claim 5, wherein said reflecting mirror portion comprises two reflecting mirrors being spaced apart and having a predetermined angle between the two reflecting mirrors.

7. An image projector as claimed in claim 5, wherein said two reflecting mirrors are rectangular shaped.

8. An image projector as claimed in claim 5, wherein said two reflecting mirrors are circular shaped.

9. An image projector as claimed in claim 5, wherein said two reflecting mirrors are oblong shaped.

10. An image projector as claimed in claim 2, wherein said reflecting mirror portion is vertically movable up and down so as to execute a reflection according to the operation of said two lamps.

11. An image projector as claimed in claim 1, wherein said plurality of light sources comprises two lamps disposed in one direction in view of said reflecting mirror portion.

12. An image projector as claimed in claim 11, wherein said microcomputer initiates the operation of one of the lamps when the screen vertical-to-horizontal ratio is 4 to 3 and initiates the operation of the two lamps when the screen vertical-to-horizontal ratio is 16 to 9.

13. An image projector as claimed in claim 12, wherein said microcomputer initiates the operation of said two lamps alternately for a predetermined time when the screen vertical-to-horizontal ratio is 4 to 3.

14. An image projector as claimed in claim 1, wherein said reflecting mirror portion comprises a reflecting mirror a part of which is fixed and another part of which is folded or unfolded toward one plane according to screen vertical-to-horizontal ratios.

15. An image projector as claimed in claim 14, wherein said reflecting mirror is rectangular shaped.

16. An image projector as claimed in claim 14, wherein said reflecting mirror is circular shaped.

17. An image projector as claimed in claim 14, wherein said reflecting mirror is oblong shaped.

18. An image projector as claimed in claim 14, wherein said reflecting mirror portion is obliquely movable up and down so as to execute a reflection depending on the operation of said two lamps.

* * * * *